SPLIT ROLLER BEARINGS

Original Filed Aug. 15, 1962

INVENTOR
SYDNEY KAY, DECEASED
BY SYDNEY PITFIELD KAY, EXECUTOR
BY Irwin H. Thompson
ATTY.

SPLIT ROLLER BEARINGS

Original Filed Aug. 15, 1962

INVENTOR
SYDNEY KAY, DECEASED
BY SYDNEY PITFIELD KAY, EXECUTOR
BY Irwin S. Thompson
ATTY.

SPLIT ROLLER BEARINGS

Original Filed Aug. 15, 1962

INVENTOR
SYDNEY KAY, DECEASED
BY SYDNEY PITFIELD KAY, EXECUTOR
BY Irwin A. Thompson
ATTY.

SPLIT ROLLER BEARINGS

Original Filed Aug. 15, 1962

INVENTOR
SYDNEY KAY, DECEASED
BY SYDNEY PITFIELD KAY, EXECUTOR
BY Irvin & Thompson
ATTY.

United States Patent Office

Re. 26,591
Reissued May 27, 1969

26,591
SPLIT ROLLER BEARINGS

Sydney Kay, deceased, late of King's Lynn, Norfolk, England, by Sydney Pitfield Kay, executor, Bexley, England, assignor to Cooper Roller Bearings Company Limited, Norfolk, England, a British company Original No. 3,166,363, dated Jan. 19, 1965, Ser. No. 217,211, Aug. 15, 1962. Application for reissue Feb. 10, 1967, Ser. No. 626,349
Int. Cl. F16c *33/46, 33/58, 33/30*
U.S. Cl. 308—236 3 Claims

Matter enclosed in heavy brackets [ ] appears in the original patent but forms no part of this reissue specification; matter printed in italics indicates the additions made by reissue.

*ABSTRACT OF THE DISCLOSURE*

*A split roller bearing assembly is disclosed having an inner race member split into two parts along lines of separation that are at an angle to the axis of the bearing. Each inner race part comprises a combination of a track portion on which the rollers bear, and a clamping portion of like construction at each side of the track portion, whereby the assembly is symmetrical about the transverse axis of the rollers.*

This invention relates to split roller bearings having an inner race which is split to form two semi-circular parts to facilitate assembly on a shaft, an outer race which is similarly split, and a cage located between these races and holding the rollers in spaced relationship circumferentially of the races.

It is usual to provide a shaft at opposite ends thereof with two types of such bearings, viz. a locating type and a non-locating type, the former holding the shaft against axial movement while the latter permits a certain axial float to accommodate expansion and contraction of the shaft due, for example, to variation of temperature or to shaft deflection. It is known to provide the locating type of bearing with clamping rings for clamping the split inner race on the shaft but various difficulties are experienced with known designs. First, the locating bearing is longer axially than the non-locating bearing so that housings of different sizes are required whereas it would be advantageous to be able to make housings all of the same size for either kind of bearing. Moreover, difficulty is experienced in locating the races and bearings axially in relation to each other without axial displacement causing friction between moving parts. Still further difficulties arise in production in relation to ease of machining, grinding and hardening.

The object of the invention is to provide improved bearings of the locating kind.

[According to the invention the bearing comprises an inner race split into two semi-circular parts, an outer race split into two semi-circular parts, rollers between the races, a cage for locating the rollers in spaced relationship circumferentially of the races, and annular clamping means similarly split and located on each side of the inner race, the axial length of the inner race being the same as or smaller than the axial length between the outer faces of the clamping means, said clamping means being located axially on the inner race, means for holding the parts of the clamping means and inner race together and preventing relative axial displacement of these parts, first inwardly directed abutment surfaces integrally formed on said clamping means and flame hardened to resist wear, serving for axial location against the rollers, and second inwardly directed abutment surfaces integrally formed on the outer race parts for axial location against the rollers. The axial location may be accomplished by providing annular grooves in the outer surface of the inner race spaced from the ends of the race and engaged by annular ribs or projections on the clamping means. Alternatively the split clamping means may be integral with the inner race parts.]

*In common with locating bearings of the type heretofore provided, the bearing of the present invention has a split inner race formed of two complementary sections, and a split outer race also formed of two complementary parts. The split inner race, as is usual for a locating type bearing, is arranged to be clamped to the shaft on which it is mounted, and the outer race, as usual, is retained in a housing. Rollers are interposed between the inner and outer races with a roller cage arranged to keep the rollers in spaced relation to one another. It is necessary that the various parts of the bearing assembly be held against relative axial movement.*

*According to this invention the split inner race is formed of two mating semi-circular parts, providing on their exterior a track portion or trackway about which rollers, spaced as usual within a cage, are located, and on which they roll. At each side of the track portion adjacent the rollers are similar clamping means for holding them together and clamping the inner race member on the shaft. As hereinafter more fully appears, the clamping means may be integral parts of the split inner race member, or they may include separate split rings interfitted with the split race members to prevent relative endwise movement, but in either case those parts at each side of the track provide portions which bear against the ends of the rollers and have a working clearance with the cage. They serve for axial location of the rollers in the assembly, and may be provided by lateral extensions on the clamping rings where the clamping rings are separated from the inner race member, or where the clamping means are integral with the inner race members, by recessing the track surface between shoulders on the clamping portions at each side of the track. The split outer race member similarly has a track portion on which the rollers bear with an inwardly-extending lip at each side positioned to bear against the ends of the rollers whereby the outer race member is confined against axial movement relative to the rollers. As so constructed, the inner race member is clamped to the shaft, the rollers are confined on the track of the inner race against axial movement relative to the inner race, and the outer race member in turn held against relative axial movement by the engagement of said lips against the ends of the rollers. The entire assembly is symmetrical about the transverse axis of the assembly, and the maximum length of the inner race assembly is no greater than the distance in an axial direction from the outer face of one clamping means to the outer race of the other. With this arrangement, the more common arrangement of constructing the inner face longer at one side of the transverse axis of the rollers than the other is unnecessary, and the housing that will accommodate a non-locating bearing will be adequate to accommodate the locating type bearing.*

Constructional forms of the invention will now be described by way of example with reference to the accompanying drawings, wherein.

Figure 1:
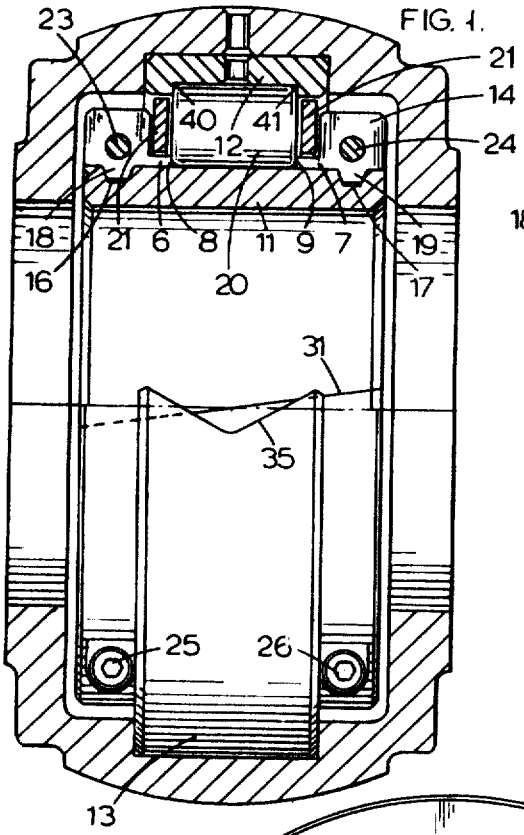
FIGURE 1 is a side view, partly in section, of one construction of a bearing made in accordance with the invention.

In the Figures, 10 and 11 are split semi-circular inner race parts; 12 and 13 are split semi-circular outer race parts. In FIGURES 1 to 6, 14 and 15 are split clamping means in the form of split ring parts, made separate from the inner race. Rollers 20 are located between the inner and outer races and are held in spaced relationship circumferentially of the races by a cage 21. *In all the described embodiments the rollers 20 are disposed with the longitudinal axis of each in a plane parallel to the longitudinal axis of the bearing and are shorter than the longitudinal dimension of the inner race parts 10 and 11. The portions of the race parts 10 and 11 on which the rollers bear constitute a roller track or trackway, as do the corresponding portions of the outer race parts.* The lines of split 31 of the inner race are at an angle to the axis of the bearing; and grooves 16, 17 are machined and ground in the exterior surface of the inner race *parts, one at each side of the track portion.* These grooves are spaced from the ends of the race *parts and* receive correspondingly shaped annular ribs or projections 18, 19 on the clamping rings. The clamping rings are made of a flame hardening steel. The projections 18, 19 rigidly position the clamping rings 14, 15 for the axial loading and positioning set up through the rollers 20. The inner race has an unchanging outer diameter except for the grooves 16, 17 so that it can easily be machined and ground. The clamping rings are formed with integral annular lips or flanges 6, 7, the inner surfaces 8, 9 of which form a pair of annular abutment surfaces locating axially against the rollers *to restrain them against axial movements longitudinally of the bearing assembly.* These surfaces are flame hardened. *In each described embodiment of the invention the construction at each end of the bearing, i.e., on both sides of the roller track, is the same.*

Figure 2:
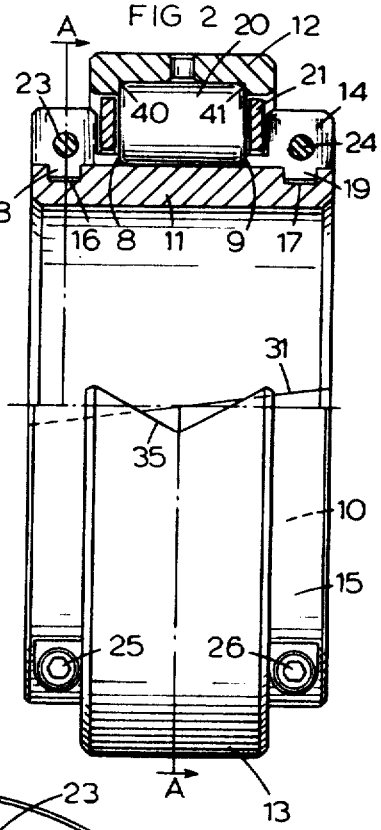
FIGURE 2 is a side view, partly in section, of a second construction of a bearing made in accordance with the invention.
Figure 3:
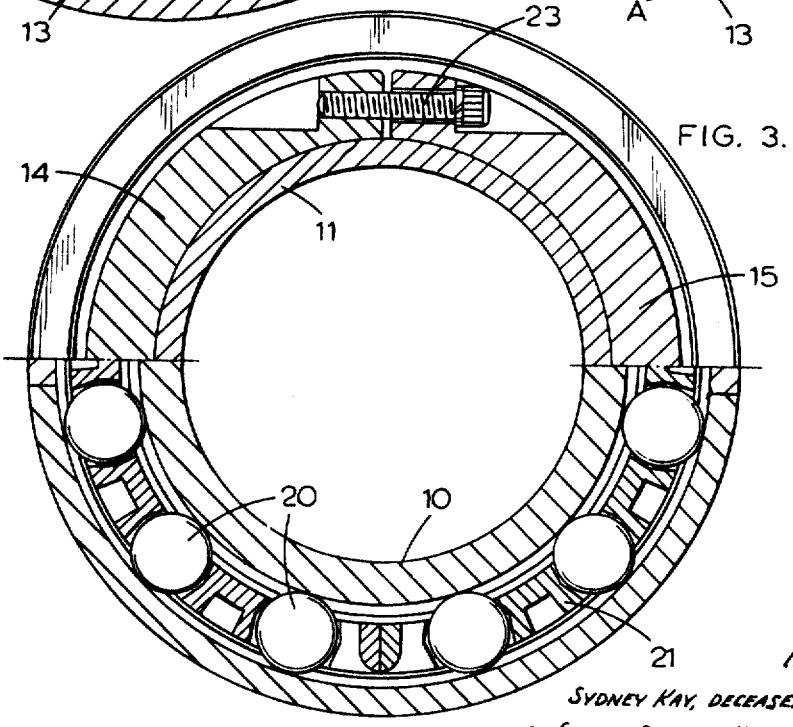
FIGURE 3 is a sectional elevation, taken on line A—A of FIGURE 2.
Figure 4:
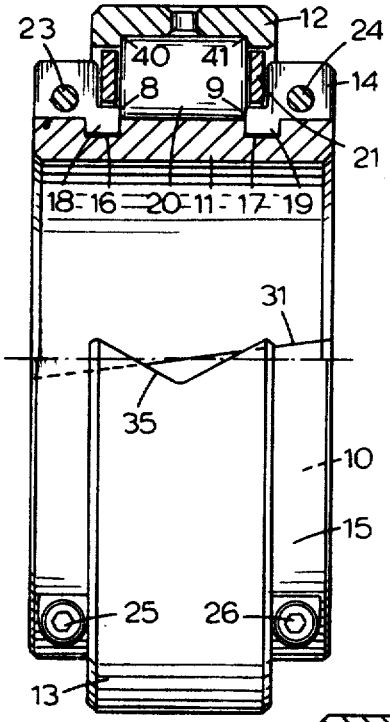
FIGURE 4 is a side view, partly in section, of a third construction of the bearing made in accordance with the invention.

In FIGURE 1 the grooves and projections are tapered in cross-section. In FIGURE 2 the grooves and projections have sides parallel to each other and to the ends of the races. Screws 23, 24 and 25, 26 disposed on chords of the circular races serve to clamp the clamping ring parts 14, 15 together and in FIGURES 1 and 2 these screws are in the planes of the projections 18, 19. In FIGURE 4, the projections and grooves are offset inwardly from the planes of the screws 23–26 so that the inner surfaces of the projections 18 are contiguous with the abutment surfaces 8, 9.

Figure 5:
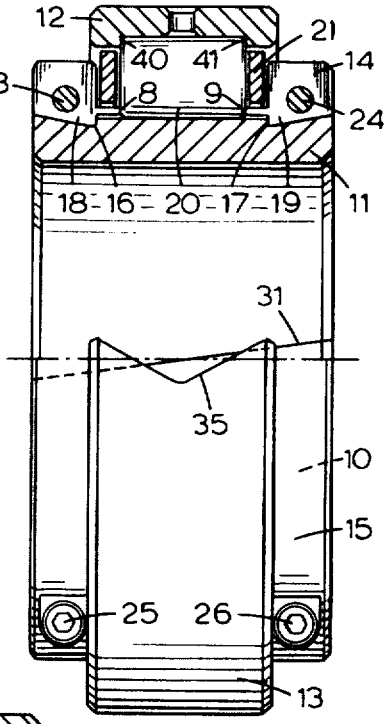
FIGURE 5 is a side view, partly in section, of a fourth construction of the bearing made in accordance with the invention.

In FIGURE 5, the clamping rings have tapered bores. The inner race has a taper ground on each end, i.e., the groove is of varying diameter with its deepest part innermost and the clamping ring, when tightened up on the taper will pull down and mate with the vertical face of the inner race. The thrust face of the clamping ring then forms a true ring against which the rollers 20 can run and the thrust taken through the rollers is transmitted to this face.

Figure 6:
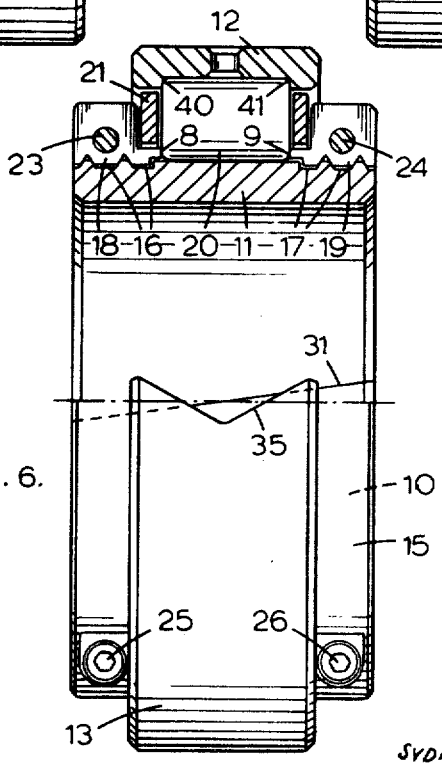
FIGURE 6 is a side view, partly in section, of a fifth construction of the bearing made in accordance with the invention.

In FIGURE 6 the grooves are formed as "still" threads and are ground on each end of the inner race. The ribs or projections on the clamping rings 14, 15 are in the form of threads corresponding to the threads on the inner race and these mate together when tightened up. Here again the thrust set up through the rollers 20 is transmitted to the vertical face 8, 9 of the clamping ring.

In FIGURES 7 to 11 the [split inner race parts are integral with the clamping ring] *complementary split inner race parts have integral ring portions at each side of the roller track instead of separate split rings as in FIGURES 1 to 6.*

Figure 7:
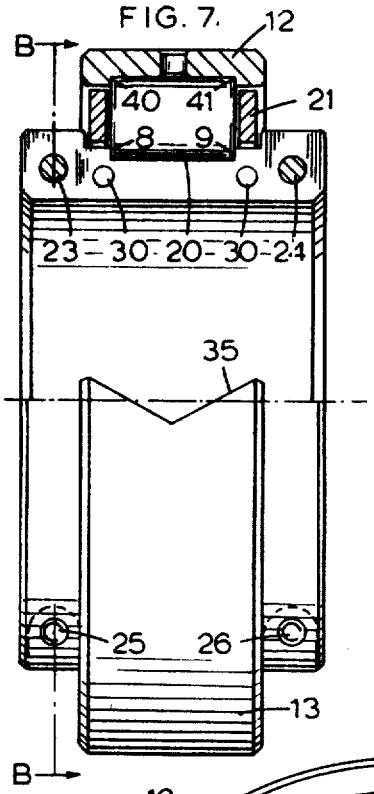
FIGURE 7 is a side view, partly in section, of a sixth construction of the bearing made in accordance with the invention.
Figure 9:
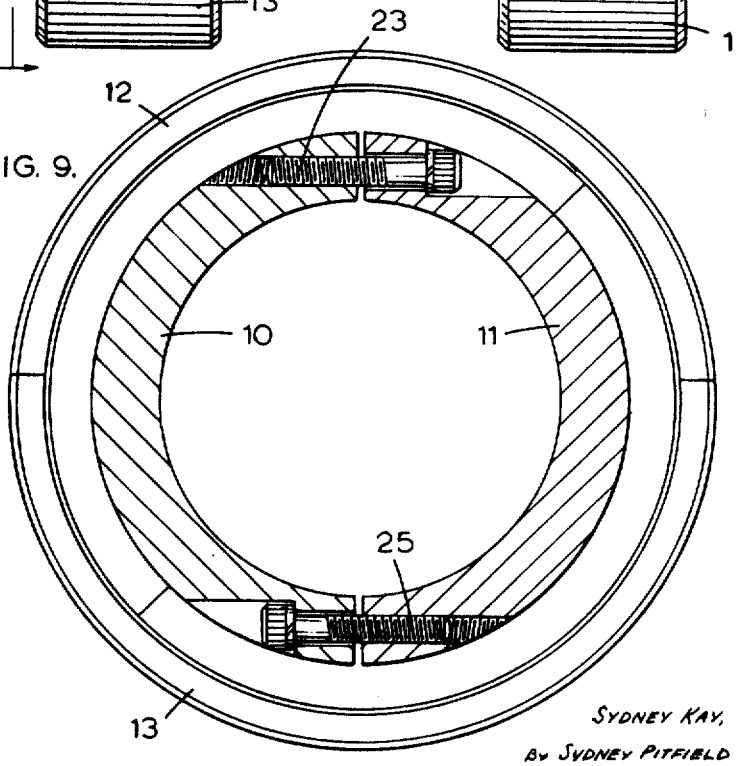
FIGURE 9 is a sectional elevation taken on line B—B of FIGURE 7.

In FIGURES 7 and 9 the two parts are held together by bolts and dowels. The bolts 23, 24, 25, 26, each of which passes with clearance through a bore in one part, are threaded into tapped bores in the other part. [The] *There are* dowels 30 *that* fit tightly in bores in both parts *to hold them against relative axial movement.*

Figure 8:
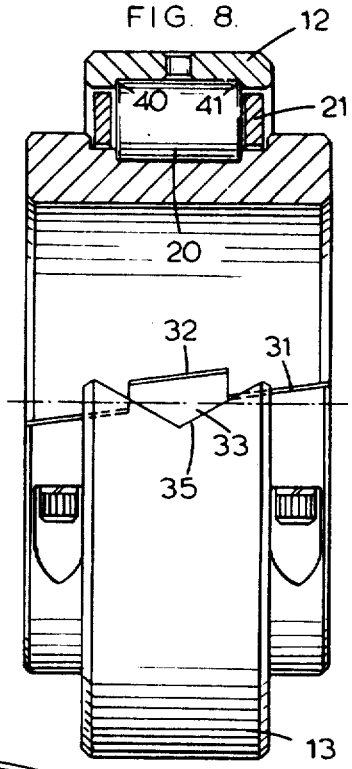
FIGURE 8 is a side view, partly in section of a seventh construction of the bearing made in accordance with the invention.

In FIGURE 8 *clamping bolts are provided similar to FIGS. 7 and 9 for holding the two parts of the inner race together and* movement between the two halves of the inner race is eliminated by means of a tenon joint. At each engaging position one end *of the two race members* is provided with a groove 32 and the other [half with] *member has* a tongue 33 *fitted into the groove.*

Figure 10:
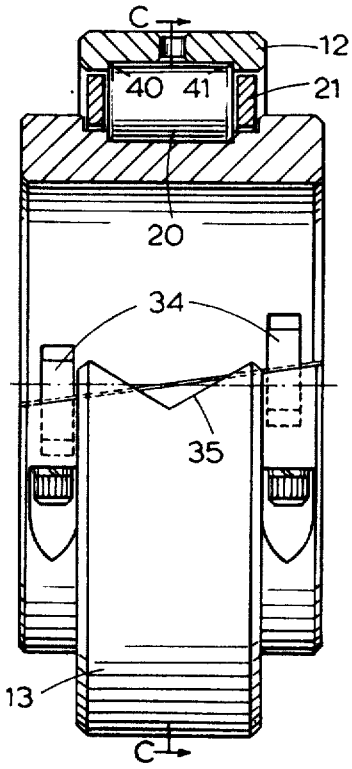
FIGURE 10 is a side view partly in section of another construction of the bearing in accordance with the invention.
Figure 11:
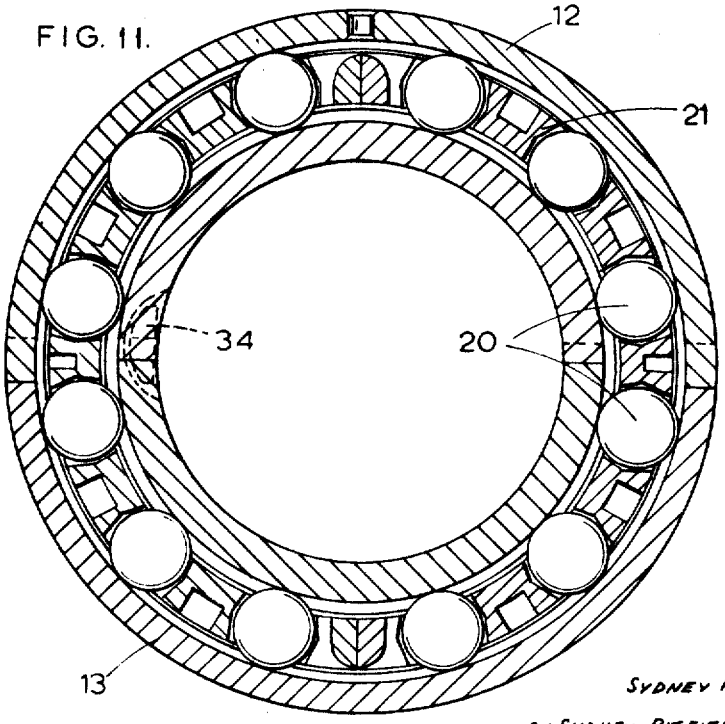
FIGURE 11 is a front sectional elevation taken on center line C—C of FIGURE 10.

In FIGURES 10 and 11 *where bolts similar to bolts 23 of FIGS. 7 and 9 hold the two parts of the inner race together, relative endwise* movement between the two halves of the inner race is eliminated by means of half-moon or "Woodruff" keys 34. These keys may be positioned at any part of each joint.

[The] *In all of the several modifications here shown, the* split outer race part 13 is provided with a V-shaped indent 35 at one end and a corresponding shape projection (not shown) at its other end. The outer race part 12 is similarly provided with an indent and a projection and the two parts are arranged so that the projection of each part mates with the indent of the other part. The outer race 12, 13 has inwardly facing annular *lips providing* abutment surfaces 40, 41 *for axial location against the rollers.*

*The dowels 30 (FIG. 7), tongue 32 and grooves 33 (FIG. 8) and the keys 34 (FIGS. 10 and 11) constitute interfitting means effectively extending across the split between the inner race parts for confining the parts against relative endwise movement.*

*In FIGURES 7 to 11 the track of the inner race is recessed between the clamping portions at each end of the assembly, the vertical side walls of the recess forming abutments or annular ring parts similar to the ring portions 8 and 9 of FIGS. 1 to 6 for confining the rollers against relative endwise movement, but as shown, there is a working clearance between these abutments and the roller cage.*

The bearing is contained in a housing 42 shown only in FIGURE 1 and because of the construction of the bearing this housing can now be exactly the same for a non-locating bearing of similar loading.

I claim:

*1.* A roller bearing comprising an inner race split into two approximately semi-circular parts along lines of split that are at an angle to the axis of the bearing, an outer race split into two approximately semi-circular parts along lines of split that are at an angle to the axis of the bearing, cylindrical rollers located radially between the races and having their axes parallel to the axis of the bearing, a cage for locating the rollers in spaced relationship circumferentially of the races, the cage having portions disposed axially beyond both ends of the rollers, annular clamping means split into ring parts and located on each side of the inner race, said inner race having an axial length which is no greater than the axial length between the outer faces of said clamping means, screws means having substantial clearance with one of said ring parts for clamping the ring parts together tightly on the inner race, means positively locating said ring parts in both directions axially on the inner race, at least one integral annular lip on each ring part extending inwardy past adjacent cage parts into contact with the rollers, said ring parts being composed of hardenable steel, said lips being hardened at least where they contact the rollers, means having interengaging surfaces substantially normal to the axis of the bearing positively locating said inner race parts against axial displacement relative to each other in both directions, and inwardly directed abutment surfaces on the outer race parts for axial location against the rollers.

*2. A roller bearing comprising an inner race split into two approximately semi-circular parts along lines of split that are at an angle to the axis of the bearing, an outer race split into two approximately semi-circular parts along lines of split that are at an angle to the axis of the bearing, each part having a track portion that matches the track portion of the other part, cylindrical rollers located radially between the races and having their axes parallel to the axis of the bearing and which roll about the track portions of the semi-circular parts, a cage for locating the rollers in spaced relationship circumferentially of the races, the cage having portions disposed axially beyond both ends of the rollers, annular clamping means split into ring parts and located on each side of the inner race at the ends of the track portions of the respective parts, said inner race having an axial length which is no greater than the axial length between the outer faces of said clamping means, screw means having substantial clearance with one of said ring parts for clamping the ring parts together tightly on the inner race, means positively locating said ring parts in both directions axially on the inner race, at least one integral annular lip on each ring part extending inwardly past adjacent cage parts into contact with the rollers, said ring parts being composed of hardenable steel, said lips being hardened at least where they contact the rollers, means having interengaging surfaces substantially normal to the axis of the bearing positively locating said inner race parts against axial displacement relative to each other in both directions, and inwardly directed abutment surfaces on the outer race parts for axial location against the rollers, the ring parts being integral with the inner race parts on which they are fixed and the bearing being symmetrical about the transverse axes of the rollers.*

*3. A roller bearing comprising an inner race split into two approximately semi-circular parts along lines of split that are at an angle to the axis of the bearing, an outer race split into two approximately semi-circular parts along lines of split that are at an angle to the axis of the bearing, each part having a track portion that matches the track portion of the other part, cylindrical rollers located radially between the races and having their axes parallel to the axis of the bearing and which roll about the track portions of the semi-circular parts, a cage for locating the rollers in spaced relationship circumferentially of the races, the cage having portions disposed axially beyond both ends of the rollers, annular clamping means split into ring parts and located on each side of the inner race at the ends of the track portions of the respective parts, said inner race having an axial length which is no greater than the axial length between the outer faces of said clamping means, screw means having substantial clearance with one of said ring parts for clamping the ring parts together tightly on the inner race, means positively locating said ring parts in both directions axially on the inner race, at least one integral annular lip on each ring part extending inwardly past adjacent cage parts into contact with the rollers, said ring parts being composed of hardenable steel, said lips beings hardened at least where they contact the rollers, means having interengaging surfaces substantially normal to the axis of the bearing positively locating said inner race parts against axial displacement relative to each other in both directions, and inwardly directed abutment surfaces on the outer race parts for axial location against the rollers, the ring parts being separate from the inner race parts on which they are fixed and having an interfitting engagement with said race parts arranged to confine them against relative endwise movement thereon.*

References Cited

The following references, cited by the Examiner, are of record in the patented file of this patent or the original patent.

UNITED STATES PATENTS

| | | | |
|---|---|---|---|
| 991,862 | 5/1911 | Lockwood | 308—236 |
| 1,024,344 | 4/1912 | Langevin | 308—236 |
| 1,212,253 | 1/1917 | Perkins | 308—213 |
| 1,338,939 | 5/1920 | Laycock | 308—213 |
| 799,471 | 9/1905 | Kincaid | 308—216 |
| 991,862 | 5/1911 | Lockwood | 308—236 XR |
| 1,024,344 | 4/1912 | Langevin | 308—236 XR |
| 1,116,845 | 11/1914 | Rogers | 308—236 |
| 1,220,633 | 3/1917 | Kirth | 308—236 XR |
| 1,644,611 | 10/1927 | Rieffert | 308—216 XR |
| 2,048,972 | 7/1936 | Scheffler | 308—236 XR |
| 2,528,987 | 11/1950 | Ablett | 308—216 |

FOREIGN PATENTS

| | | |
|---|---|---|
| 446,569 | 1/1946 | Canada. |
| 1,073,248 | 11/1956 | Germany. |
| 132,423 | 5/1949 | Australia. |
| 432,621 | 12/1911 | France. |
| 446,569 | 2/1948 | Canada. |

MARTIN P. SCHWADRON, *Primary Examiner.*

F. SUSKO, *Assistant Examiner.*